United States Patent
Noebe et al.

(10) Patent No.: US 7,749,341 B2
(45) Date of Patent: Jul. 6, 2010

(54) PRECIPITATION HARDENABLE HIGH TEMPERATURE SHAPE MEMORY ALLOY

(75) Inventors: Ronald Dean Noebe, Medina, OH (US); Susan L. Draper, Westlake, OH (US); Michael V. Nathal, Strongsville, OH (US); Edwin A. Crombie, West Chester, PA (US)

(73) Assignee: The United States of America as represented by the Administrator of National Aeronautics and Space Administration, Washington, DC (US)

( * ) Notice: Subject to any disclaimer, the term of this patent is extended or adjusted under 35 U.S.C. 154(b) by 15 days.

(21) Appl. No.: 11/370,391

(22) Filed: Mar. 6, 2006

(65) Prior Publication Data

US 2007/0204938 A1    Sep. 6, 2007

(51) Int. Cl.
   *C22C 30/00*    (2006.01)
(52) U.S. Cl. .................. 148/402; 148/442; 420/580
(58) Field of Classification Search .............. 148/402
   See application file for complete search history.

(56) References Cited

U.S. PATENT DOCUMENTS

| | | | |
|---|---|---|---|
| 4,865,663 A | 9/1989 | Tuominen et al. | |
| 5,114,504 A | 5/1992 | AbuJudom, II et al. | |
| 5,641,364 A | 6/1997 | Golberg et al. | |
| 6,454,913 B1 | 9/2002 | Rasmussen et al. | |
| 6,669,795 B2 | 12/2003 | Johnson et al. | |
| 2002/0189719 A1 | 12/2002 | Rasmussen et al. | |
| 2003/0168334 A1 | 9/2003 | Rasmussen et al. | |
| 2004/0187980 A1* | 9/2004 | Jung et al. | 148/563 |
| 2006/0086432 A1* | 4/2006 | Zhang et al. | 148/402 |
| 2006/0086440 A1* | 4/2006 | Boylan et al. | 148/563 |

OTHER PUBLICATIONS

Otsuka et al., "Physical metallurgy of Ti-Ni-based shape memory alloys," *Progress in Materials Science*, vol. 50, Issue 5, Jul. 2005, pp. 511-678.
Eckelmeyer, "The effect of alloying on the shape memory phenomenon in nitinol," *Scripta Metallurgica*, vol. 10, Issue 8, Aug. 1976, pp. 667-672.
Hwang et al., "Phase transformations in TiNiFe, TiNiAl and TiNi alloys," *Scripta Metallurgica*, vol. 17, Issue 11, Nov. 1983, pp. 1345-1350.
Honma et al., ICOMAT-79, Proceedings of the International Conference on Martensitic Transformations, Cambridge, MA (1979), pp. 259-264.

(Continued)

*Primary Examiner*—George Wyszomierski
(74) *Attorney, Agent, or Firm*—Robert H. Earp, III; Mark Homer

(57) ABSTRACT

A composition of the invention is a high temperature shape memory alloy having high work output, and is made from $(Ni+Pt+Y)_x Ti_{(100-x)}$, wherein x is present in a total amount of 49-55 atomic %, Pt is present in a total amount of 10-30 atomic %, Y is one or more of Au, Pd, and Cu and is present in a total amount of 0 to 10 atomic %. The alloy has a matrix phase wherein the total concentration of Ni, Pt, and the one or more of Pd, Au, and Cu is greater than 50 atomic %.

9 Claims, 3 Drawing Sheets

OTHER PUBLICATIONS

Yang et al., "Stress-Induced Transformation and Superelasticity in Ni-Ti-Nb Alloys," *Journal de Physique IV*, vol. 5, 1995, C8, pp. 771-776.

Lindquist, "Structure and Transformation Behavior of Martensitic Ti-(Ni, Pd) and Ti-(Ni, Pt) Alloys," Thesis, University of Illinois, 1978.

Wu, "Interstitial Ordering and Martensitic Transformation of Titanium-Nickel-Gold Alloys," Thesis, University of Illinois, 1986.

Noebe et al., "Properties and potential of two (Ni,Pt)Ti alloys for use as high-temperature actuator materials," Proceedings of SPIE, vol. 5761, pp. 364-375.

Duerig et al., *Engineering Aspects of Shape Metal Alloys* (London: Butterworth-Heinemann, Nov. 1990), pp. 21-35.

Shimizu et al., "Improvement of shape memory characteristics by precipitation-hardening of Ti—Pd—Ni alloys," *Materials Letters*, vol. 34, Issues 1-2, Feb. 1998, pp. 23-29.

\* cited by examiner

PRECIPITATION HARDENABLE HIGH TEMPERATURE SHAPE MEMORY ALLOY

FIELD OF THE INVENTION

The present invention concerns shape memory alloys, more especially it concerns high temperature nickel-titanium-platinum-based alloys that can be precipitation strengthened and having high force capability.

BACKGROUND OF THE INVENTION

NiTi alloys display excellent shape memory behaviour and possess outstanding specific work output, along with other unusual properties such as superelastic behaviour, good damping behaviour, and good erosion and wear resistance. These properties are widely exploited, near room temperature, in commercially available NiTi alloys for connectors, couplings, valves, seals, coatings, actuators, and various medical and dental devices. Commercially available NiTi alloys are often marketed as "Nitinol" and have an approximately 48.5-51 at % Ni and 48.5-51 at % Ti content. The uses for a material with similar properties, especially high work output, but also capable of being used at elevated temperatures are nearly limitless. Designs incorporating high temperature shape memory alloys ("HTSMA") are common and the patent literature is full of such examples. However, as with many new technologies, materials development has seriously lagged component design and no commercial shape memory alloys currently exist for high temperature applications.

The unique behavior of NiTi and other shape memory alloys is based on the reversible temperature-dependent austenite-to-martensite phase transformation. In practice, these alloys are easily deformable by twinning from an original shape while in their lower temperature form (martensite) and upon heating through the transformation to austenite, will revert back to their original shape (the shape prior to deformation of the martensite phase). This behavior is the basis for such properties as shape memory effect and superelasticity. In addition, a subset of the alloys that display shape memory effect can recover their original shape even when a substantial bias force is applied to the material. In this way, the alloy is capable of performing work, acting as a solid state actuator. NiTi, in particular, is capable specific work output with equivalent or higher energy density than pneumatic actuators or D.C. motors.

The reversible transformation of Ni—Ti shape memory alloys between the austenite and martensite phases occurs over two different temperature ranges, which are characteristic of the specific alloy. When these alloys are heated they will change from their martensite form to austenite. The temperature at which this transformation starts is the austenite start temperature ($A_s$) and the temperature at which this transformation from martensite to austenite is complete is called the austenite finish temperature ($A_f$). When the alloy is cooled from high temperature the transformation is reversed and the austenite will begin transforming to martensite at the martensite start temperature ($M_s$) and will be completely converted to martensite at the martensite finish temperature ($M_f$). Therefore, these transformation temperatures determine over what temperature range the shape memory and other effects can be observed. For NiTi, the maximum $M_s$ temperature is observed in stoichiometric Ni-50 at. % Ti and Ti-rich NiTi alloys and is about 60° C. (Otsuka and Ren, *Prog. Mater. Sci.* 50 (2005) 511). The practical use temperature for Ni—Ti alloys is even lower, because the martensite finish temperature or reset temperature for these alloys is 10-20° C. below the $M_s$ temperature. In addition, the transformation temperature may be further suppressed from what is found in as-cast ingots due to thermomechanical processing of the alloy. Thus, while the unique behavior of NiTi is widely exploited in applications near room temperature, the uses for a material with properties similar to Ni—Ti, but capable of being used at elevated temperatures (greater than 100° C.) would open up new applications for shape memory alloys, particularly in the aerospace, automotive, automation and controls, appliance, energy, chemical processing, heating and ventilation, safety and security, and electronics (MEMS devices) industries.

Alloying additions to NiTi are also well known and are primarily used to affect changes in the transformation temperatures of the resulting material: either to increase or decrease the transformation temperatures or change the width of the hysteresis. For example, Fe or Co substituted for Ni; or Al, Mn, V, or Cr substituted for Ti will severely depress the transformation temperatures of the resulting ternary alloys (K. H. Eckelmeyer, *Scripta Metall.* 10 (1976) 667 and C. M. Hwang and C. M. Wayman, *Scripta Metall.* 17 (1983) 1345). Cu has relatively little effect on the transformation temperatures while it can significantly reduce the hysteresis (T. Honma, M. Matsumoto, Y. Shugo, I. Yamazaki, in *ICOMAT-79: Proceedings of the International Conference on Martensitic Transformations,* Cambridge, Mass., (1979) pp. 259-264.) and Nb broadens the hysteresis (J. H. Yang and J. W. Simpson, *J. Phys. IV* 5 (1995) C8-771).

There is also a group of alloying additions (Pd, Pt, Au, Hf, and Zr) that can raise the transformation temperatures of NiTi. Current proposed alloying schemes are very specifically defined and involve either substitution of a precious metal for Ni, e.g., (Ni,Pd)Ti, (Ni,Pt)Ti, (Ni,Au)Ti (as described by Lindquist, in "*Structure and Transformation Behavior of Martensitic Ti—(Ni,Pd) and Ti—(Ni,Pt) Alloys,*" Thesis, University of Illinois, 1978 and Wu, "*Interstitial Ordering and Martensitic Transformation of Titanium-Nickel-Gold Alloys,*" Thesis, University of Illinois 1986), or substitution of a reactive element like Hf or Zr for Ti, e.g., Ni(Ti,Hf) and Ni(Ti,Zr), (as claimed by AbuJudom, II et al., U.S. Pat. No. 5,114,504).

However, having a high transformation temperature does not guarantee that the material will have specific work output acceptable for actuator use as demonstrated for Ni-30Pt-50Ti (at. %) alloys (R. Noebe, et al., SPIE Conf. Proc. Vol. 5761, (2005), pp. 364-375). Furthermore, of these high-temperature ternary NiTi-based systems, useful work characteristics have only been verified in Ni(Ti,Hf) thin films by Rasmussen et al. (U.S. Pat. No. 6,454,913 and patent Pub. No. US2002/0189719A1). To our knowledge, work measurements have not been made public on any of the other potential high-temperature NiTi-based systems. Furthermore, the Ni(Ti,Hf) alloys mentioned previously can only be used in practice in applications up to about 100° C. because of the wide hysteresis in these alloys such that the $M_f$ is near or below 100° C., and there is little chance of increasing the use temperature (transformation temperature) of these alloys by further increasing the Hf level due to microstructural limitations. The wide hysteresis for the Ni(Ti,Hf) alloys also makes them unsuitable for applications where active control is involved.

Methods for processing HTSMA have also been described in the literature. Tuominen, et al. (U.S. Pat. No. 4,865,663 (1989)) claimed a series of (Ni,Pd)Ti—B alloys for increased fabricability. Goldberg et al. (U.S. Pat. No. 5,641,364 (1997)) have claimed a method for manufacturing and heat treating (Ni,Pd)Ti, Ni(Ti,Zr) and Ni(Ti,Hf) alloys for improved shape recovery characteristics. Rasmussen et al. (U.S. Pat. No. 6,454,913 (2002)) have claimed a method for forming thin film deposits of Ni(Ti,Hf) alloys particularly by magnetron sputtering. Johnson et al. (U.S. Pat. No. 6,669,795 (2003)) have described a method for making HTSMA thin films using multiple sputtering targets where the goal was to create an alloy that has a 1:1 atomic ratio of (Ni+X):Ti or Ni:(Ti+Y) where X is an element from the right side of the periodic table such as Pd, Pt, Au, or Cu and Y is an element from the left side of the periodic table such as Hf or Zr. Patents have also been applied for the method of producing low hysteresis (Ni,Cu)(Ti,Hf) thin films (Rasmussen et al., US patent Pub. No. 2002/0189719) and (Ni,Pd)Ti thin films (Rasmussen et al., US patent Pub. No. 2003/0168334). In all cases, compositions have been restricted to alloys containing Ti or Ti-equivalents of 50% or greater.

In all cases where high transformation temperatures are required, standard practice in the art is to maintain a ratio of (Ni+X) to (Ti+Y) (where X=Pd, Pt, Au, Cu and Y=Hf, Zr) that is stoichiometric, e.g., 1:1 or that is slightly (Ti+Y)-rich in composition. It is well known that in binary NiTi (Melton, in *Engineering Aspects of Shape Memory Alloys*, 1990) and in (Ni,Pd)Ti (S, Shimizu, et al., Maters. Lett, 34(1998)23) and in Ni(Ti,Hf) alloys (AbuJudom, II et al., U.S. Pat. No. 5,114,504 (1992)), that even the slightest deviation toward (Ni+X)-rich stoichiometries results in an extremely steep decrease in the transformation temperatures of the alloy negating the ability to use these alloys at high temperatures. Another consequence, of this "control" of stoichiometry is that Ti-rich alloys will contain $Ti_2Ni$ type precipitates, which form during melting as coarse globular interdendritic structures that are not amenable to control through heat treatment and at best do not benefit properties and at worst limit fatigue, fracture strength, and martensite volume fraction.

SUMMARY OF THE INVENTION

An exemplary alloy of the present invention is a high temperature shape memory alloy having a high work output. An exemplary alloy has a composition of $(Ni+Pt+Y)_xTi_{(100-x)}$, wherein x is present in about 49-55 atomic percent, Pt is present in a total amount of about 10-30 atomic %, Y is one or more of Au, Pd, and Cu is present in a total amount of about greater than 0 to 10 atomic %. The exemplary alloy of the present invention has a tertiary phase diagram which shows a matrix phase in which the total concentration of Ni, Pt, and one or more of Au, Pd, and Cu is greater than 50 atomic %.

An exemplary method of forming an allow of the present invention includes arc melting or induction melting the alloy components. Thereafter, the components are subject to a thermomechanical processing. Then, the components are heat treated at 600° C. for 30-60 minutes to form the alloy.

BRIEF DESCRIPTION OF THE DRAWINGS

The invention is best understood from the following detailed description when read in connection with the accompanying drawing. It is emphasized that, according to common practice, the various features of the drawing are not to scale. On the contrary, the dimensions of the various features are arbitrarily expanded or reduced for clarity. Included in the drawing are the following figures.

DETAILED DESCRIPTION OF THE INVENTION

This application describes a novel family of Ni—Ti—Pt precipitation hardenable high-temperature shape memory alloys for use up to at least 400° C. with good work characteristics suitable for use as solid state actuators and for other applications that can benefit from shape memory, pseudoelastic, or other properties of this alloy. The alloy can be processed into bulk forms such as bar, rod, sheet, plate, and especially wire, through conventional thermomechanical processes.

Without wishing to be bound by any theory, it is presently thought that the key to this innovation is development of Ni—Pt—Ti based alloys optimized for high martensite transformation temperatures while maintaining a stoichiometry that consists of a composition that is Ti-lean compared to a 1:1 (Ni+Pt):Ti stoichiometry, from which Ni-rich intermetallic phases such as $(Ni,Pt)_3Ti_2$ and other possible Ni-rich phases can be precipitated. Alloys containing O, C, B, N can have more than 50 at % bulk Ti concentration, but still result in a material, that after precipitation of the respective Ti-rich interstitial phases, would behave as a Ti-lean alloy and also result in precipitation of various Ni-rich phases.

The composition range described in this present invention includes alloys consisting of $(Ni+Pt+Y)_xTi_{(100-x)}$ in which x is 49-55 (atomic percent), in which Pt is present in a total amount of 10-30 at %, Y is one or more of Au, Pd and Cu and is present in a total amount of 0 to 10 at %, and the total concentration of Ni, Pt and any Pd, Au and Cu in the matrix phase is greater than 50 at %. If Ti-rich phases are precipitated, the bulk Ti concentration can exceed 50 at % whilst the matrix still meets the requirement that Ni, Pt, Pd, Au and Cu is greater than 50 at % after precipitation of any Ti-rich phases.

Figure 1:
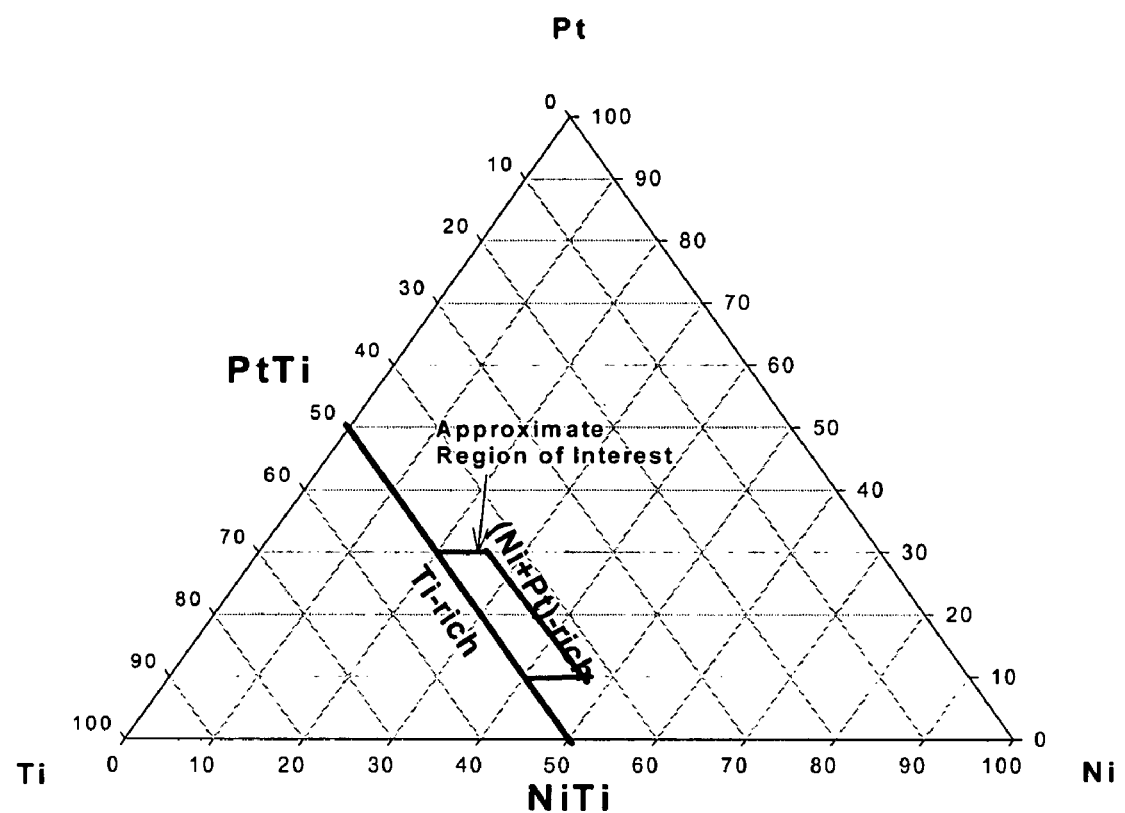
FIG. 1 is a Ni—Ti—Pt ternary phase diagram showing the line of constant stoichiometry between NiTi and PtTi and regions considered Ti-rich and (Ni+Pt)-rich along with the approximate region of interest for exemplary alloy compositions of the present invention.
Figure 2:
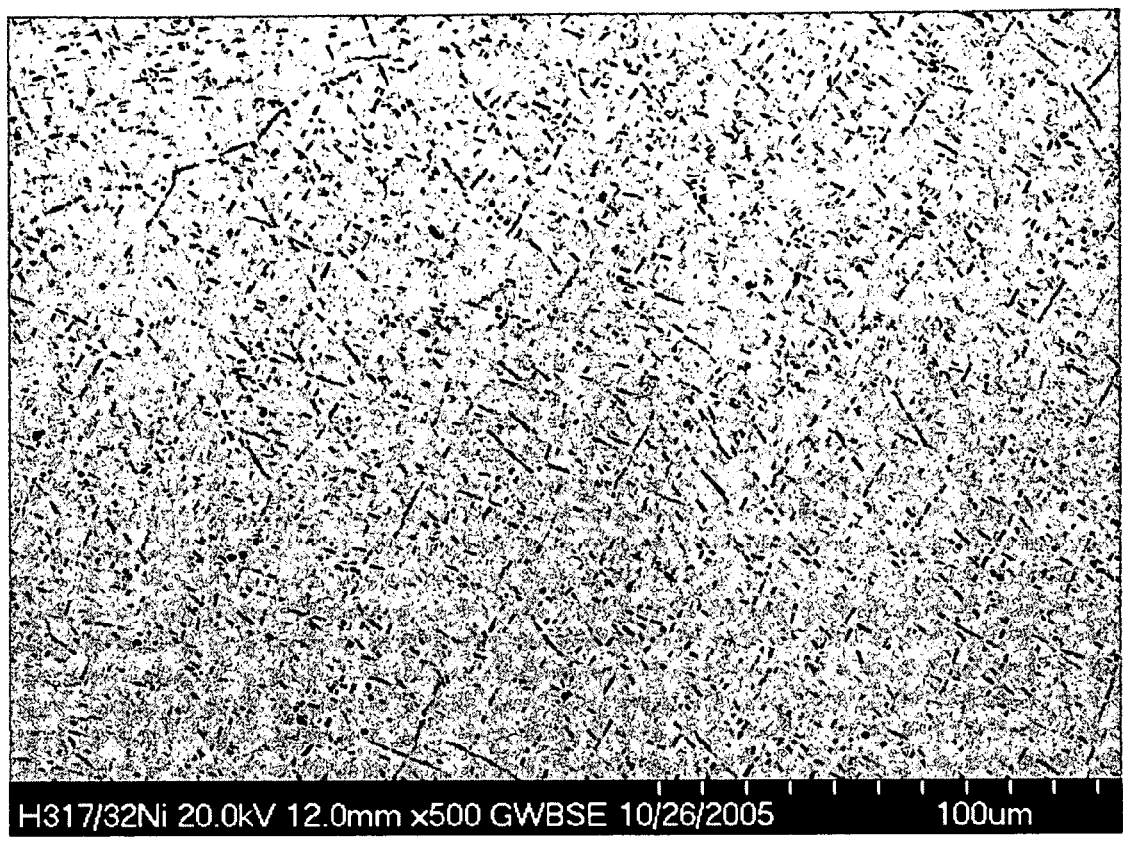
FIG. 2 is a micrograph showing a representative lathe-like structure formed in an exemplary Ti-32Ni-20Pt (at. %) alloy during cooling from swaging the exemplary alloy (at 1100° C.)
Figure 3:
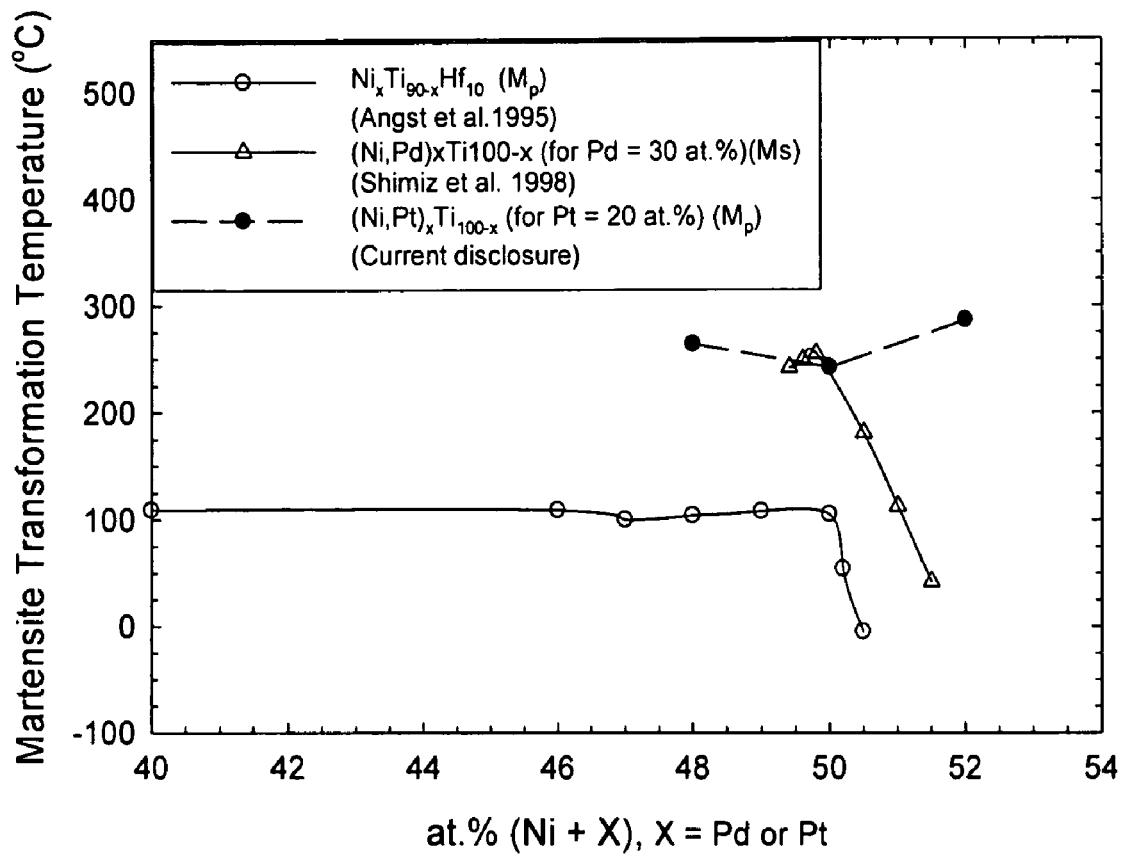
FIG. 3 represents transformation temperatures for exemplary NiTi-based alloys as a function of stoichiometry all showing, except an exemplary NiTiPt alloy of the present invention, a steep drop in transformation temperature once the composition begins to slightly exceed a (Ni+X)-rich stoichiometry.

Compositional control is maintained either through direct control of stoichiometry of the major elements during melting or indirectly by drawing Ti out of the melt or solid state through precipitation, by such intentional or unintentional additions as C, O, N, or B. The objective is to get the resulting composition of the matrix phase to reside just to the Ni+Pt-rich side of the line of constant stoichiometry between NiTi and TiPt in the ternary phase diagram (FIG. 1) resulting in the precipitation of various plate-like phases with composition essentially consisting of $(Ni,Pt)_3Ti_2$. The volume fraction of precipitate phase is controlled by the composition of the alloy and heat treatment and can be optimized depending on property requirements; however, the volume fraction of second phase does not have to be significant to greatly benefit the properties of the alloy. Through various thermal processes including cooling from elevated (>800° C.) temperatures and aging between 500 and approximately 700° C., micron size Ni-rich precipitates, with plate-like morphology, are formed in the resulting alloy (FIG. 2). The thin plate-like precipitates provide several benefits:

1) The precipitates act to buffer the alloy matrix composition such that the high transformation temperatures are maintained or increased in the alloy. As shown in Table 1, Ti-lean (Ni,Pt)Ti alloys exhibit higher transformation temperatures than alloys with similar Pt contents but that are stoichiometric or Ti-rich. This behavior is completely counter to that of binary NiTi and other ternary NiTi alloys (as shown in FIG. 3) where even the slightest deviations in stoichiometry to an alloy that is Ni-rich (Ti-lean) results in a precipitous drop in transformation temperature.

2) The precipitate phase improves the yield strength or resistance of the austenite phase to deformation by dislocation processes, increasing the mechanical stability of the alloy at high temperatures. Additionally, the precipitate phase increases the resistance of the martensite phase to deformation by dislocation processes, while still permitting deformation by twinning to occur quite readily. This enhances the stability of the martensite phase and together these effects result in an alloy with greater potential work output and better dimensional stability or resistance to walking during thermal cycling under load especially at elevated temperatures.

In general, these alloys can be produced by conventional melting practices, either by arc melting or induction melting, to produce a cast ingot or other casting. With induction melting, it is possible to use graphite molds and in the process use this as a way to generate (Ni+Pt)-rich alloys. Through the introduction of carbon from the mold and the formation of Ti—C precipitates, the remaining matrix phase could end up (Ni+Pt)-rich if the original nominal composition of the alloy was stoichiometric or near stoichiometric but Ti-rich. In this case, a microstructure consisting of a few percent of micron size carbide particles and fine plates of $(Ni,Pt)_3Ti_2$ precipitates will form. Similar strategies can be used to develop appropriate alloys using O, N, or B in order to reduce excess Ti to just cross-over into the (Ni+Pt)-rich region.

The castings are then thermomechanically worked as in conventional metallurgical practice, in order to develop a wrought structure, which results in superior mechanical properties compared to as-cast structures. This can be done by one or more of rolling, extrusion, swaging, and drawing. The advantage with these alloys is that the solidus for the precipitate phase is near 800° C. and therefore, thermomechanical processing above that temperature is performed on a material that is single phase and much more amenable to mechanical processing than Ti-rich alloys. For example, stoichiometric (Ti-30Ni-20Pt at. %) and Ti-lean alloys (Ti-32Ni-20Pt at. %) can be readily processed by hot swaging into fine bar stock, however, it is not possible to swage Ti-rich compositions (i.e., Ti-28Ni-20Pt) due to severe cracking of the material.

These Ni—Ti—Pt alloys also can be readily processed by hot rolling, forging, and extrusion, with a preferred method for fabricating thin rod and wire being multiple hot extrusion at temperatures above 800° C. followed by centerless grinding to remove oxide and pickling products from the surface of the material. These materials should also be amenable to wire drawing by conventional practice.

As wrought processing will generally suppress the transformation temperature of the alloys, it will probably be necessary to follow thermomechanical processing with a stress relief heat treatment at a temperature below the recrystallization temperature of the alloy. For these alloys, a typical stress relief treatment to fully recover the high-transformation temperature of the alloys would be ½ to 1 hr at 600° C. The recrystallization temperature for these materials is above 800° C. An alternate heat treatment is a brief 5-10 minute exposure at 800° C., followed by aging at 500 to 700° C. for times ranging from 10-360 minutes. This two-stage heat treatment serves to solution the alloy, recover the wrought structure, and precipitate out a fine second phase distribution of plate-like precipitates. Multiple variations in these heat treatments are also possible.

A primary anticipated function of these alloys would be for use as actuator materials, taking advantage of the material's ability to recover shape against a biasing force of some kind. However, not all alloys capable of shape memory behavior can actually do any significant work against a bias force, and this problem is exacerbated at higher temperatures (R. Noebe, et al., SPIE Conf. Proc. Vol. 5761, (2005), pp. 364-375). However, the precipitation strengthened alloys of the present invention are capable of a maximum work output of at least 10 $J/cm^3$ with transformation temperatures greater than 300° C., though for repeated actuation cycles the device would be designed so that the HTSMA would be exposed to stresses that are significantly less than that required to generate the maximum work output for enhanced device life.

TABLE 1

Transformation temperatures of swaged 20Pt Ti—Ni—Pt HTSMA alloys of various stoichiometry.

| Stoichiometry | Composition (at. %) | $M_s$ (° C.) | $M_f$ (° C.) | $A_s$ (° C.) | $A_f$ (° C.) |
|---|---|---|---|---|---|
| Ti-rich | Ti—28Ni—20Pt | 292 | 231 | 276 | 336 |
| Stoichiometric | Ti—30Ni—20Pt | 275 | 218 | 264 | 315 |
| (Ni, Pt)-rich | Ti—32Ni—20Pt | 301 | 266 | 319 | 351 |

Exemplary alloys of the present application have demonstrated high-temperature, high force capability with solid state transformation temperatures 100° C. to over 400° C. Conventional NiTi alloys, at best, have transformation temperatures on the order of 70 to 100° C., with practical use temperatures of close to 50° C. Other alloys with high transformation temperatures (NiTiPd and NiTiHf) have demonstrated work capability only for compositions that exhibit transformation temperatures below 150° C. and the NiTiHf alloys exhibit extremely wide hysteresis and are not adequate for applications requiring active control.

While achieving a high transformation temperature, which equates to a high use temperature, the exemplary NiPtTi alloys of the present invention are still capable under proper conditions of greater than 10 J/cm3 specific work output, and good cyclic work performance, which is comparable to conventional binary NiTi alloys.

Under proper conditions, exemplary alloys of the present invention can be processed into thin rod and even fine diameter wire. The thermomechanical processing required to create such product forms results in room temperature tensile ductilities of greater than 10% and ultimate tensile strengths in excess of 1400 MPa while improving specific work output.

Exemplary alloys of the present invention have a small hysteresis, on the order of 40° C., adequate for active control of SMA actuators. Actuators with built in sensing capability also can be developed based entirely on passive response to changes in ambient temperature.

As a result of the slight Ti-lean composition, the formation of $Ti_2Ni$ phase may be avoided in these alloys, which phase is a coarse globular interdendritic phase that cannot be thermally controlled since it appears during solidification. Instead, these new alloys rely on precipitation of fine (Ni,Pt)-rich $(Ni,Pt)_3Ti_2$ structures and other intermetallic phases for enhanced performance. These precipitates are often lathe-like in structure and in many cases submicron in size. The precipitate volume fraction can also be controlled through heat treatment. These phases result in additional strengthening of the austenite (high-temperature) matrix phase and serve to increase the resistance of the martensite phase against slip, without having a significant effect on the detwinning stress. These factors increase the materials specific work output, and overall, results in better shape memory and mechanical properties, especially at high temperatures.

Unlike any known NiTiX systems (NiTiPd, NiTiHf, NiTiZr), NiTiPt compositions that are Ti-lean according to an exemplary embodiment of the present invention do not exhibit a steep decrease in transformation temperature compared to the stoichiometric versions and in fact have higher transformation temperatures than similar alloys with Ti-rich compositions.

Aging results in a further increase and stabilization of the transformation temperature, while other ternary systems exhibit a decrease in transformation temperature with increased aging time or repeated thermal cycling.

A further advantage of exemplary alloys of the present invention is that they have a high recrystallization temperature (>800° C.) that make them amenable to heat treatment after thermomechanical processing so that the precipitation heat treatments can be utilized after thermomechanical processing, without adversely affecting grain size and making thermomechanical processing easier.

Also because of the high recrystallization temperature, exemplary alloys of the present invention are ideal for use in applications where there is a possibility that the material would be subjected to significant over-temperature during actuation or use. Such over temperature conditions would not degrade the microstructure or properties of the alloy.

In practice, different applications will require different transformation temperatures, which may be accomplished by varying the Pt content between 10 and 30 atomic percent. Thus exemplary alloys of the present invention include a series of similar alloys that meets the need for high work output and other shape memory behaviours, similar to conventional NiTi alloys, but that can be used over a broad range of temperatures from 100 to 400° C., or more.

A viable HTSMA for actuator applications would find significant use in various controls, instrumentation, and novel actuator systems in the aerospace, automotive, automation and controls, consumer appliances, energy, chemical processing, heating and ventilation, safety and security, and electronics (MEMS devices) industries. In aero-engine applications, smart systems already have been designed to address flow control issues along the length of the engine including adaptive inlets; internal flow control devices such as rods, ridges or bumps that can be inserted into the flow path when needed for connecting the flow during times of instability; variable area fan and exhaust nozzles; shape changing blades and vanes; actively controlled airfoils; adaptive chevrons; and active clearance control around compressor and turbine blades, to name just a few. The successful progression of each of these concepts to production requires new actuation materials such as the NiPtTi alloys of the invention. Thus, we believe that there will be interest in HTSMA-actuated structures for high speed aircraft and missiles, in HTSMA for energy related applications and high temperature sealing applications, for possible applications relating to high temperature fuel cells and for fire control applications in fuel and hydraulic lines.

Countless other applications would become apparent once material was available for general use.

Conventional actuator constructions may be used, but the special properties of the HTSMA permits the development of novel forms of actuators for specific requirements.

What is claimed:

1. A composition comprising a high temperature shape memory alloy having high work output, and comprising (Ni+Pt+Y)$_x$Ti$_{(100-x)}$, wherein x is present in a total amount of 49-55 atomic %, Pt is present in a total amount of 10-30 atomic %, Y is one or more of Au, Pd, and Cu and is present in a total amount of 0 to 10 atomic %, and having a matrix phase wherein the total concentration of Ni, Pt, and the one or more of Pd, Au, and Cu is greater than 50 atomic % wherein the alloy comprises one or more (Ni,Pt)-rich precipitate phases comprising micron or sub-micron size plate-like particles.

2. The composition as claimed in claim 1, further comprising one or more of O, C, B and N, and wherein the quantity of Ti in the matrix phase is less than 50 atomic % after precipitation of Ti-rich interstitial phases.

3. The composition as claimed in claim 1, wherein the (Ni,Pt)-rich precipitate phases include a (Ni,Pt)$_3$Ti$_2$ phase.

4. The composition as claimed in claim 3, wherein the alloy has Ti-rich interstitial precipitate phases.

5. The composition as claimed in claim 1, wherein the alloy has a transition temperature above 100° C. and wherein the alloy is capable of shape memory behaviour.

6. The composition as claimed in claim 1, wherein the alloy has a transition temperature above 100° C. and wherein the alloy is capable of high specific work output and dimensional stability under repeated actuation.

7. The composition as claimed in claim 1, wherein the alloy has a recrystallization temperature of above about 800° C.

8. A high temperature actuator comprising an alloy as claimed in claim 1.

9. The composition as claimed in claim 1, wherein the high work output is at least 10 J/cm$^3$.

* * * * *